(12) United States Patent
Hwang et al.

(10) Patent No.: US 7,625,952 B2
(45) Date of Patent: Dec. 1, 2009

(54) CARBON NANOCAPSULE-LAYERED SILICATE HYBRID AND PREPARATION METHOD THEREOF

(75) Inventors: Gan-Lin Hwang, Tainan (TW); Shih-Jung Tsai, Hsinchu (TW); Jiang-Jen Lin, Taichung (TW); Yi-Fen Lan, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 145 days.

(21) Appl. No.: 11/826,032

(22) Filed: Jul. 11, 2007

(65) Prior Publication Data

US 2008/0293833 A1 Nov. 27, 2008

(30) Foreign Application Priority Data

Apr. 24, 2007 (TW) ............................... 96114374 A

(51) Int. Cl.
*C08L 23/06* (2006.01)
*C08L 23/08* (2006.01)
*C08L 51/06* (2006.01)

(52) U.S. Cl. .................................... 516/110; 428/292.1

(58) Field of Classification Search .................. 516/110
See application file for complete search history.

(56) References Cited

U.S. PATENT DOCUMENTS

| 6,872,236 | B1 | 3/2005 | Hwang et al. |
| 7,156,958 | B2 | 1/2007 | Hwang et al. |
| 2004/0126303 | A1 | 7/2004 | Hwang |
| 2005/0181015 | A1* | 8/2005 | Zhong ........................ 424/426 |
| 2005/0261760 | A1* | 11/2005 | Weber ........................ 623/1.38 |
| 2006/0008404 | A1 | 1/2006 | Hwang |

FOREIGN PATENT DOCUMENTS

EP    1512718 A1 *   3/2005

OTHER PUBLICATIONS

Liu et al., "Preparation and characterization of iron-encapsulating carbon nanotubes and nanoparticles", Journal of Materials Chemistry, Royal Society of Chemistry, Sep. 14, 2000, p. 1-12.*

* cited by examiner

*Primary Examiner*—Ling-Siu Choi
*Assistant Examiner*—Chun-Cheng Wang
(74) *Attorney, Agent, or Firm*—Birch, Stewart, Kolasch & Birch, LLP

(57) ABSTRACT

A carbon nanocapsule-layered silicate hybrid is provided. Layered silicates (platelet-shaped) as a dispersant are mixed with carbon nanocapsules (sphere-shaped) by a physical process. The physically mixed hybrid exhibits a homogeneous dispersion phase due to the geometric shape inhomogeneity factor. Aggregation of carbon nanocapsules is thus avoided. The hybrid can be dispersed in a polar or non-polar solvent with a solid content of about 0.01-30 wt %.

28 Claims, 6 Drawing Sheets

CARBON NANOCAPSULE-LAYERED SILICATE HYBRID AND PREPARATION METHOD THEREOF

BACKGROUND OF THE INVENTION

1. Field of the Invention

The invention relates to dispersion technology of carbon nanocapsules, and in particular to a carbon nanocapsule-layered silicate hybrid and a method of preparing the same.

2. Description of the Related Art

As shown in FIG. 1, a carbon nanocapsule (CNC) is a polyhedral carbon cluster composed of an enclosed multi-layer graphite structure, whose diameter ranges from 1 to 100 nm but is usually 30-40 nm. As to the graphite layer on the shell of a carbon nanocapsule, the central parts are exclusively six-member rings, the corners are composed of five-member rings, and every carbon atom is $sp^2$ hybrid orbital. The center of the carbon nanocapsule may be hollow or filled with metal as shown in FIG. 2. The carbon nanocapsule is brought about by well-developed graphitic structure, with thermal and electric conductance, high mechanical strength, chemical stability, large superficial content, firm structure and electromagnetic interference shielding. Carbon nanocapsules can be utilized in various fields such as biomedical, energy and optoelectronic application. A serious obstacle to the development of these applications is the poor dispersion behavior of carbon nanocapsules.

Pristine carbon nanocapsules have an aggregation configuration and is not readily processible. FIG. 3 shows the aggregation of carbon nanocapsule under transmission electron microscopy (TEM). Owing to the strong van der Waals force between carbon nanocapsule particles, it is not easy to disperse carbon nanocapsules in solvent, which makes it undesirable for use. To improve the dispersion behavior of carbon nanocapsules, attempts have been made by chemical modification and physisorption. Chemical modification (or chemical functionalization) includes strong oxidation, atom transfer radical polymerization, and free radical polymerization. The mechanism of chemical modification involves surface modification with reactive functionality, followed by grafting with organic long chains. Physical adsorption may be carried out by ultrasonication or grinding with solvent, which involves adsorption of small organic molecules, surfactants, polymers, or proteins only through weak intermolecular interactions such as π-π stacking force and electrostatic force.

BRIEF SUMMARY OF THE INVENTION

According to one aspect of the invention, a carbon nanocapsule-layered silicate hybrid is provided, comprising a plurality of carbon nanocapsules and a plurality of layered silicates, wherein the carbon nanocapsules and the layered silicates are physically mixed and mutually dispersed to exhibit a homogeneous dispersion phase, wherein a weight ratio of the carbon nanocapsules to the layered silicates is about 1:10 to 10:1.

According to another aspect of the invention, a method for preparing a carbon nanocapsule-layered silicate hybrid is provided, comprising providing a plurality of carbon nanocapsules having a spherical shape, providing a plurality of layered silicates having a platelet-shape, and mixing the carbon nanocapsules and the layered silicates by a physical process for exerting a shear force such that the carbon nanocapsules and the layered silicates are mutually dispersed into a homogeneous dispersion due to geometric shape difference, thus forming the hybrid, wherein a weight ratio of the carbon nanocapsules to the layered silicates is about 1:10 to 10:1.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
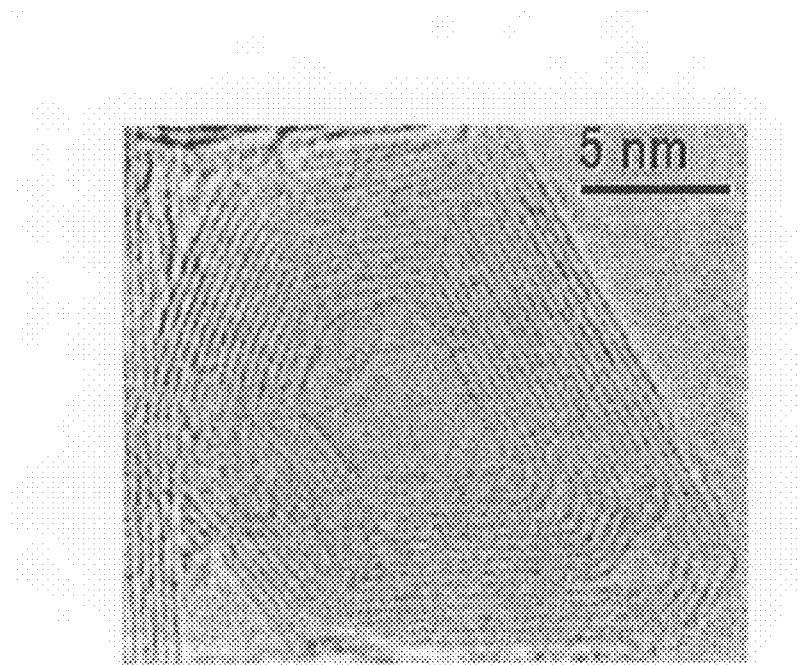
FIG. 1 is a TEM picture of a hollow carbon nanocapsule.
Figure 2:
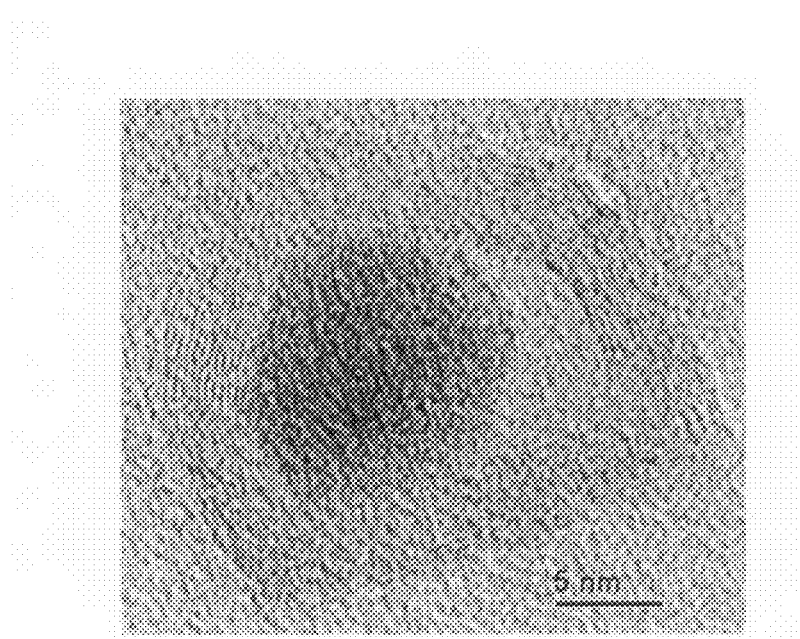
FIG. 2 is a TEM picture of a metal-filled carbon nanocapsule.
Figure 3:
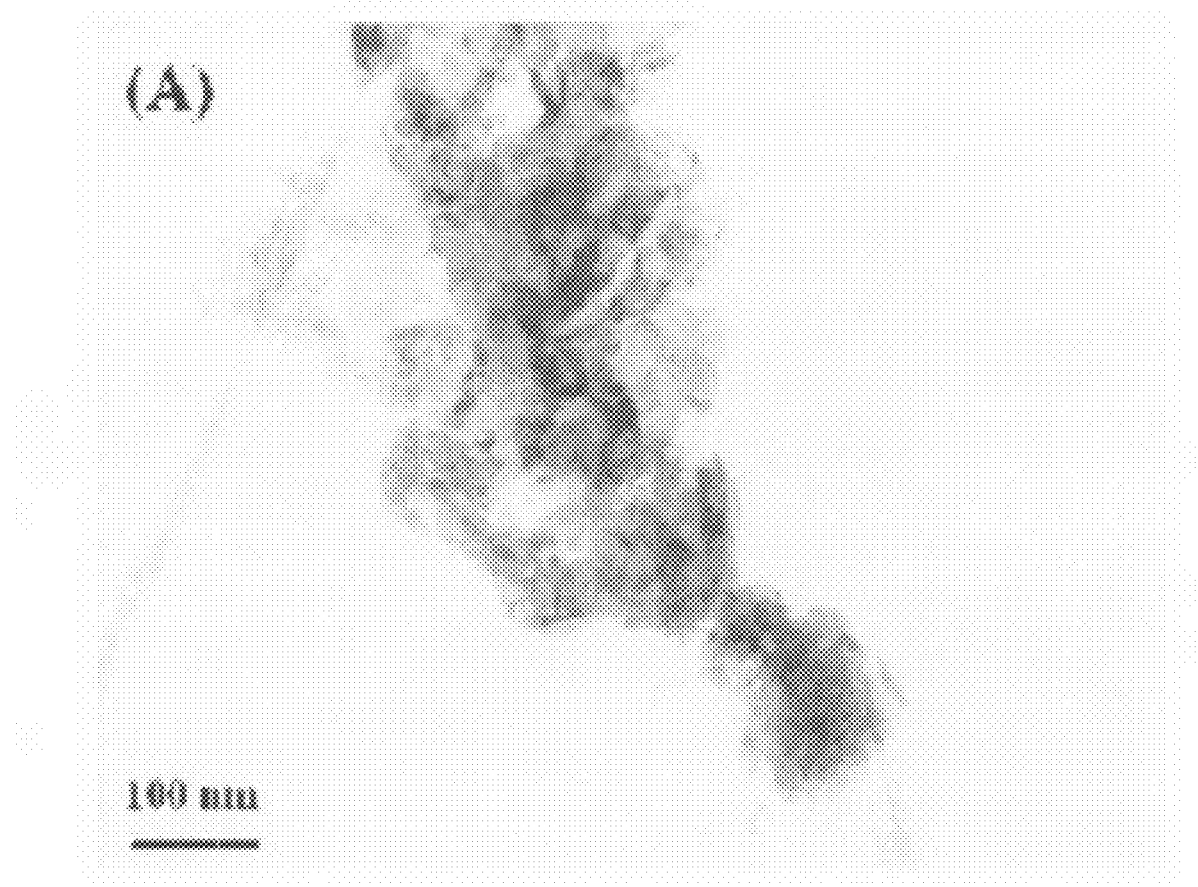
FIG. 3 is a TEM picture showing aggregation of a carbon nanocapsule.
Figure 4:
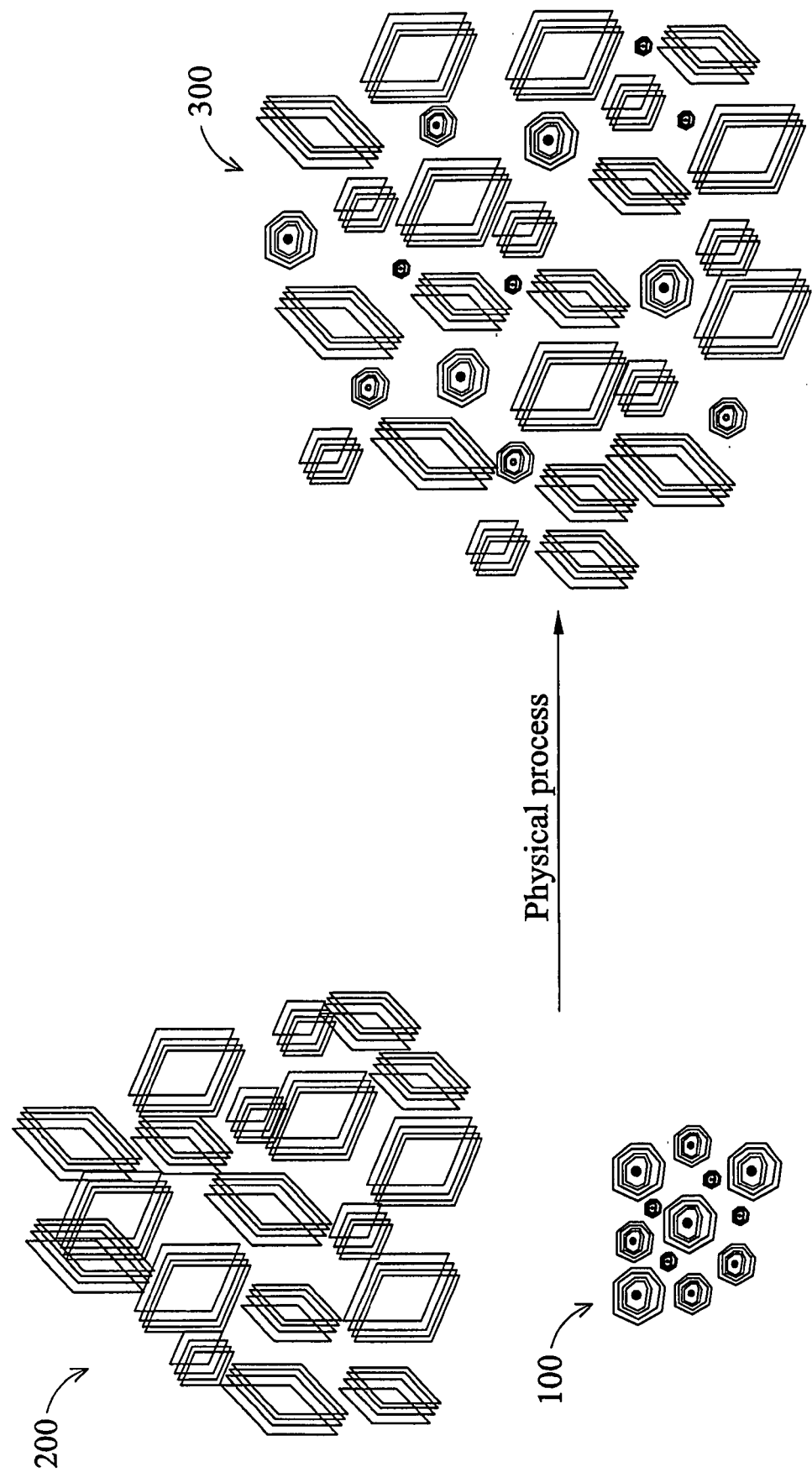
FIG. 4 is a schematic diagram showing a mechanism for dispersing a carbon nanocapsule by layered silicate.

According to the invention, the dispersion of carbon nanocapsules is accomplished via the factor of geometric shape difference (geometric shape inhomogeneity factor). As shown in FIG. 4, platelet-shaped layered silicate 200 is employed as a dispersant for dispersing spherical-shaped carbon nanocapsule (CNC) 100 by a physical process, thereby forming a CNC-layered silicate hybrid 300. The physically mixed hybrid 300 exhibits a fine, homogeneous dispersion phase due to redistribution of van der Waals attraction force that originally exists in the CNC aggregation. The hybrid 300 can be readily dispersed in a polar or a non-polar solvent and therefore readily processible. Advantages of using layered silicate for dispersing CNC include avoiding structural damage to CNC and preserving desirable properties of CNC. Furthermore, layered silicate has a higher thermal stability than conventional organic dispersants.

The carbon nanocapsule to be used in the invention is not specifically limited. It can include hollow carbon nanocapsules, heteroatom-containing carbon nanocapsules, or carbon nanocapsules filled with elementary metals, metal alloys, or metal compounds such as metal oxide, metal carbide, metal sulfide, metal nitride, metal borate, and so on. In addition, the carbon nanocapsule may have a modified surface to carry various functional groups. The manufacture of carbon nanocapsules are described in U.S. Pat. No. 7,156,958, entitled "Preparation of hollow carbon nanocapsules", U.S. Pat. No. 6,872,236, entitled "Preparation of magnetic metal-filled carbon nanocapsules", U.S. Patent Publication No. 2004/0126303 A1, entitled "Organically functionalized carbon nanocapsule", and U.S. Patent Publication No. 2006/0008404 A1, entitled "Hetero-nanocapsule and method of preparing the same", the disclosures of which are hereby incorporated by reference.

The layered silicate used as a dispersant in the invention comprises nanoscale silicate platelets. The dispersion ability of the layered silicate is related to its aspect ratio. In general, the higher the aspect ratio, the better the dispersion ability, and the less the amount required for dispersion. In one embodiment, the layered silicate has an aspect ratio of at least 30. For example, the layered silicate may have an aspect ratio of about 50-5000. The weight ratio of the carbon nanocapsule to the layered silicate may range from about 10:1 to about 1:10. In one embodiment, the weight ratio the carbon nanocapsule to the layered silicate is about 2:1 to about 1:5.

The layered silicate suitable for use herein includes, but is not limited to, smectite clay, vermiculite, halloysite, sericite, mica, synthetic mica, layered double hydroxide (LDH), synthetic smectite clay (for example, SWN available from Cope Chemical Co.), or combinations thereof. Examples of smectite clay include montmorillonite, saponite, beidellite, nontronite, hectorite, stevensite, and so on. Note that these layered silicates may be used singly or as a mixture of two or more.

The layered silicate and the carbon nanocapsule are mixed by a physical process for exerting a shear force to the mixture such that the carbon nanocapsules and the layered silicates are mutually dispersed into a homogeneous dispersion due to geometric shape difference. The physical process may optionally exert an impact force. In one embodiment, the physical process is a grinding process carried out by grind mills or by pestle and mortar. Examples of grind mills include, but are not limited to, ball mills, sand mills, three-roll mills, flat grinding machines, and so on.

According to an important feature of the invention, the layered silicate-carbon nanocapsule hybrid is amphiphilic as it contains both hydrophilic parts (layered silicate) and hydrophobic parts (carbon nanocapsule). Accordingly, the hybrid can be well dispersed in either a polar solvent or a non-polar solvent. The dispersion of the hybrid in solvent may be carried out by shaking only, or with the help of magnetic stirring, ultrasonication, or mechanical stirring to break the van der Waals attraction between carbon nanocapsule particles to provide a more uniform dispersion phase. The hybrid may be dispersed in the polar or non-polar solvent with a solid content of about 0.01-30 wt %. In one embodiment, the solid content is about 2-10 wt %.

The layered silicate-carbon nanocapsule hybrid may be dispersed in a wide variety of polar solvents, which include, but are not limited to, water, alcohols, ketones, ethers, esters, alkanoic acids, chloro-containing solvents, nitrogen-containing solvents, or combinations thereof. Examples of suitable alcohol solvents include methanol, ethanol, n-butanol, and isopropanol. Examples of suitable ketone solvents include actone, cyclohexanone, methyl ethyl ketone, and methyl t-butyl ketone. Examples of suitable ether solvents include ethyl ether, ethylene glycol ether, ethylene glycol dimethyl ether, ethylene glycol diethyl ether, and tetrahydrofuran (THF). Examples of suitable ester solvents include propylene glycol monomethyl acetate (PGMEA), ethylene glycol monoethyl ether acetate, ethyl 3-ethoxypropionate, and isoamyl acetate. Examples of suitable alkanoic acid solvents include formic acid, and acetic acid. Examples of suitable chloro-containing solvents include chloroform, and dichloromethane. Examples of suitable nitrogen-containing solvents include aniline, dimethylformamide (DMF), and N-methylpyrrolidone (NMP).

Also, the layered silicate-carbon nanocapsule hybrid may be dispersed in a wide variety of non-polar solvents, which include, but are not limited to, aliphatic hydrocarbon solvents, aromatic hydrocarbon solvents, cycloaliphatic hydrocarbon solvents, or combinations thereof. Examples of suitable aliphatic hydrocarbon solvents include n-hexane, heptane, and pentane. Examples of suitable aromatic hydrocarbon solvents include benzene, toluene, and xylene. Examples of suitable cycloaliphatic hydrocarbon solvents include cyclohexane and methylcyclohexane.

Accordingly, the invention provides a feasible, low-cost approach for dispersing carbon nanocapsule to make the carbon nanocapsule readily for use. In addition, the layered silicate has characteristics of low gas permeability and high resistance to heat, which may be adopted to expand the applications of carbon nanocapsule.

Without intending to limit the invention in any manner, the present invention will be further illustrated by the following examples.

Example 1

1 g of carbon nanocapsule (diameter: ~30 nm, purity >70%) and 1 g of synthetic mica (CO-OP Chemical Co., primary structure dimensions: 300×300×1 nm) were mixed and thoroughly ground with a pestle and mortar, thus providing a CNC-synthetic mica hybrid (Sample A, weight ratio (CNC/clay) $\alpha=1$)

The same procedures were repeated for providing a CNC-montmorillonite hybrid (Sample B), a CNC-synthetic smectite clay hybrid (Sample C), and a CNC-LDH hybrid (Sample D), wherein sodium montmorillonite from Nanocor Chemical Co. with primary structure dimensions of 100×100×1 nm, synthetic smectite clay from Cope Chemical Co. with primary structure dimensions of 50×50×1 nm, and LDH with primary structure dimensions of 200×200×1 nm were used. The relations in aspect ratio of the layered silicates are: synthetic mica >LDH >montmorillonite >synthetic smectite clay.

Figure 5:
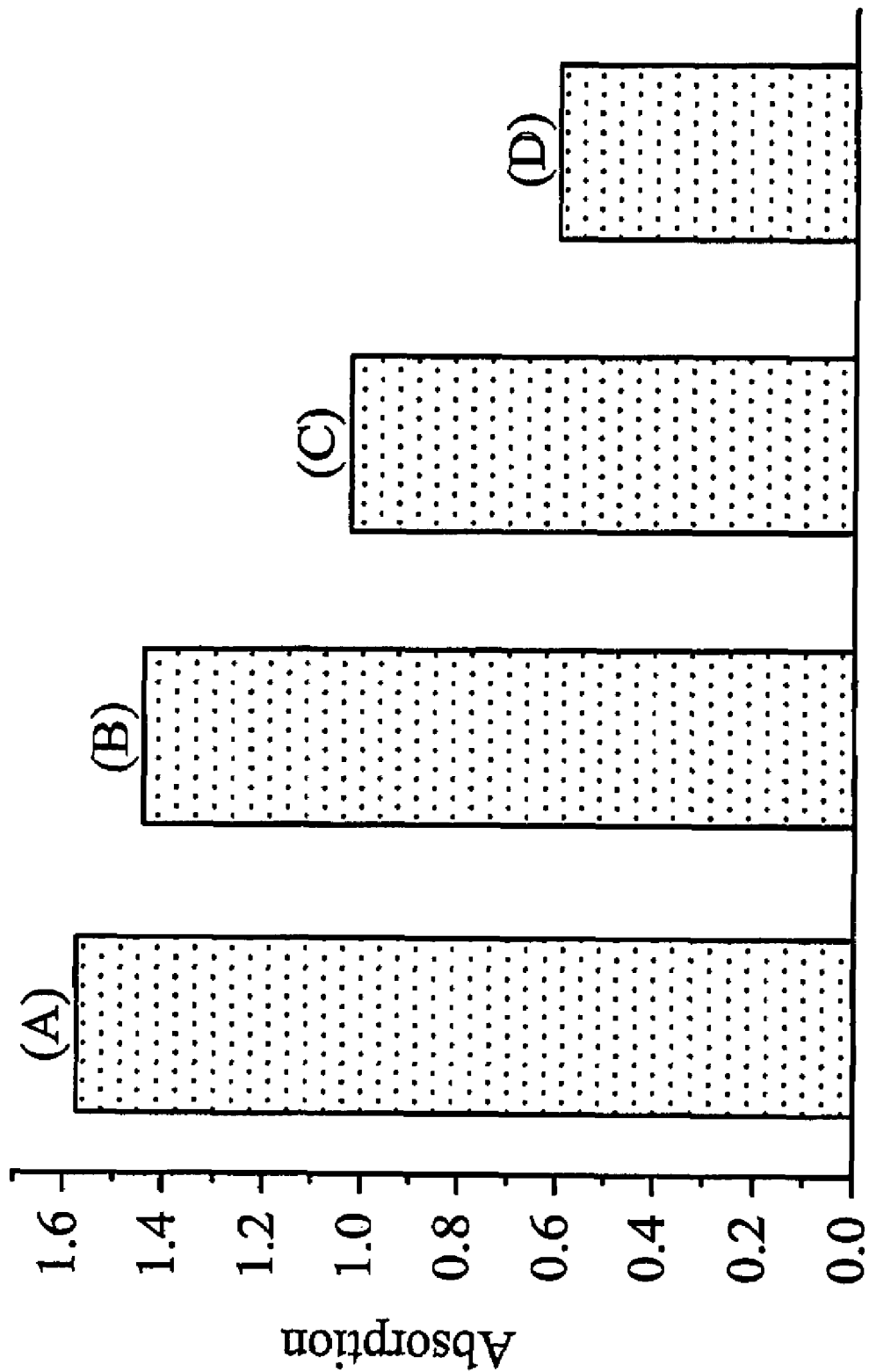
FIG. 5 is a diagram showing UV-Vis absorption of Samples A-D of Example 1.
Figure 6:
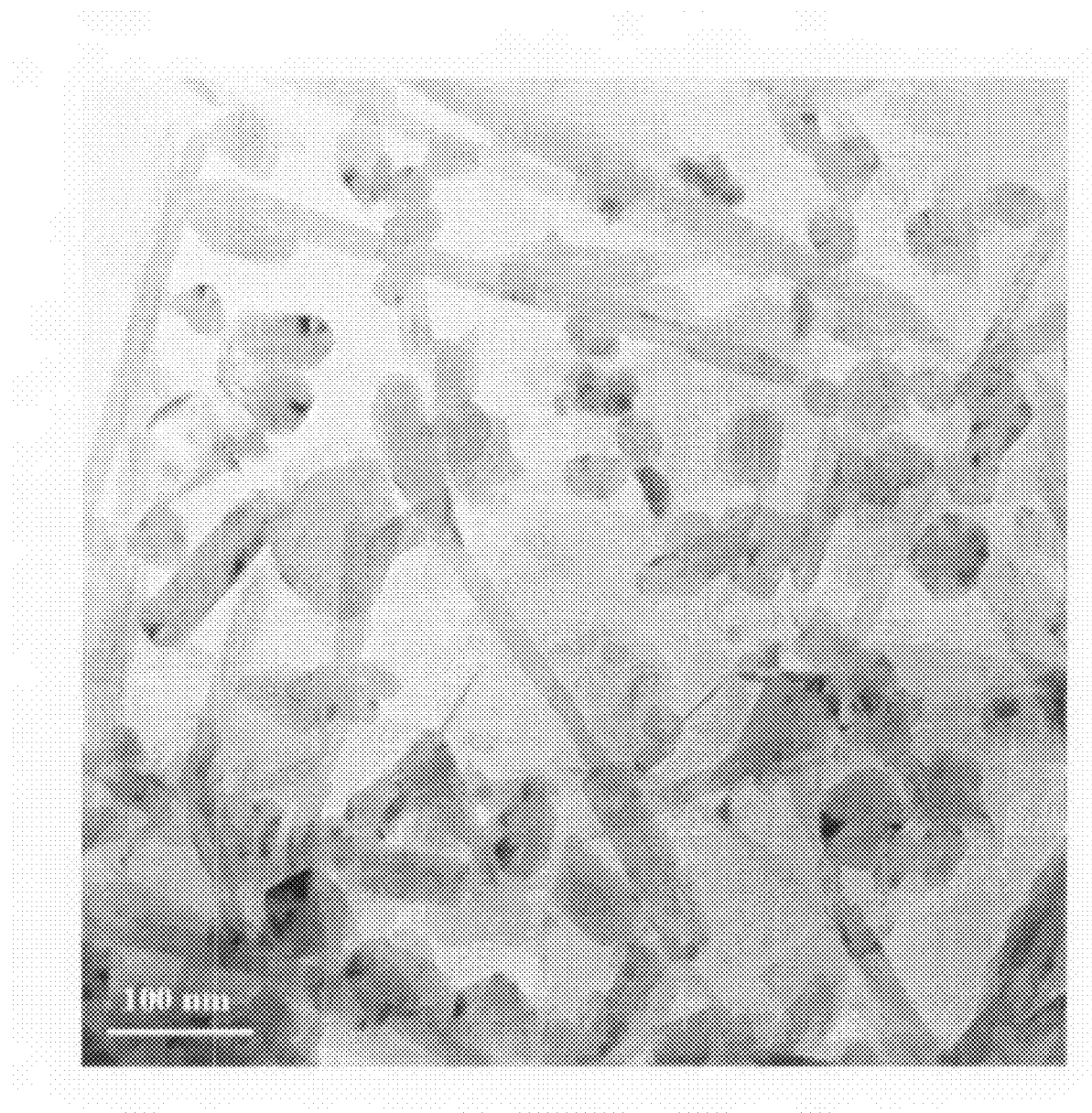
FIG. 6 is a TEM picture of a carbon nanocapsule-synthetic mica hybrid.

1 mg of the hybrid (Samples A-D, respectively) was dispersed in 5 g of water and the dispersion behavior was observed visually and determined by measuring the absorption at wavelength of 550 nm using an ultraviolet-visible spectrometer (Schimadzu UV-1601). The measurement results are shown in FIG. 5, wherein a higher adsorption represents better dispersion behavior, which indicates that the dispersion ability of layered silicate increased with the aspect ratio, with the exception of LDH. This exception is probably due to the surface charge of LDH leading to a less stable dispersion with carbon nanocapsule. FIG. 6 is a TEM picture of the carbon nanocapsule-synthetic mica hybrid, wherein carbon nanocapsules were well dispersed by mica platelets, effectively preventing the carbon nanocapsules from re-aggregation.

Example 2

Figure 7:
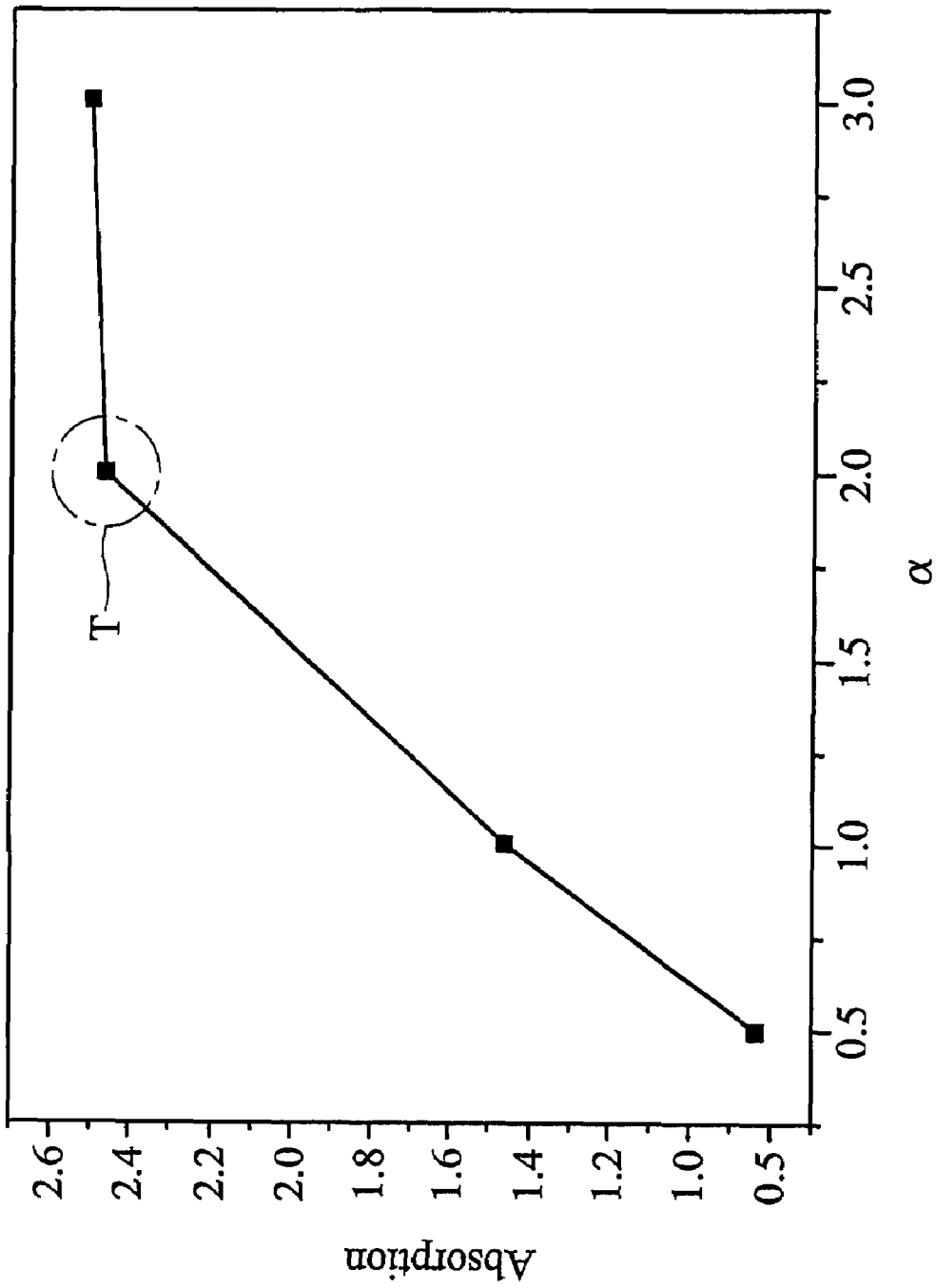
FIG. 7 is an UV-Vis absorption spectrum of carbon nanocapsule-synthetic mica hybrid in water with different clay/CNC ratios.

The same procedures as Example 1 were repeated for providing CNC-synthetic mica hybrids with weight ratios ($\alpha$=CNC/clay) of 0.5, 1, 2, and 3, respectively. 1 mg of each hybrid was dispersed in 5 g of water and the dispersion behavior was determined by measuring the absorption at 550 nm using an ultraviolet-visible spectrometer (Schimadzu UV-1601). As shown in FIG. 7, the dispersion behavior improved with increasing amounts of mica used, and the absorption was proportional to the concentration of the aqueous dispersion, obeying the Beer-Lambert's law. At the critical point T of the UV-Vis absorption spectrum, the attraction force between the carbon nanocapsule particles was almost completely eliminated, leading to a good dispersion state.

Example 3

1 mg of CNC-synthetic mica hybrid was dispersed in 5 g of different solvents and the dispersion behavior was visually observed and summarized in Table 1.

TABLE 1

| Solvent | CNC | CNC-synthetic mica hybrid |
|---|---|---|
| Water | x | o |
| Isopropyl alcohol (IPA) | x | o* |
| Methyl ethyl ketone (MEK) | x | o* |
| DMF | x | o |
| PGMEA | x | o |
| Toluene | x | o* | o: dispersed well by shaking only
x: poor dispersion or sedimentation
o*: dispersed by shaking and ultrasonication As shown in Table, the hybrid of the invention was well dispersed in all polar and non-polar solvents after ultrasonication.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A carbon nanocapsule-layered silicate hybrid, comprising:
    a plurality of carbon nanocapsules; and
    a plurality of layered silicates;
    wherein the carbon nanocapsules and the layered silicates are physically mixed and mutually dispersed to exhibit a homogeneous dispersion phase to form a carbon nanocapsule-layered silicate hybrid, wherein a weight ratio of the carbon nanocapsules to the layered silicates is about 1:10 to 10:1.

2. The carbon nanocapsule-layered silicate hybrid as claimed in claim 1, wherein the carbon nanocapsules are hollow carbon nanocapsules or heteroatom-containing carbon nanocapsules.

3. The carbon nanocapsule-layered silicate hybrid as claimed in claim 1, wherein the carbon nanocapsules are filled with elementary metals, metal compounds, or metal alloys.

4. The carbon nanocapsule-layered silicate hybrid as claimed in claim 1, wherein the layered silicates comprise smectite clay, vermiculite, halloysite, sericite, mica, synthetic mica, layered double hydroxide (LDH), synthetic smectite clay, or combinations thereof.

5. The carbon nanocapsule-layered silicate hybrid as claimed in claim 1, wherein the layered silicates are cation-exchange clay.

6. The carbon nanocapsule-layered silicate hybrid as claimed in claim 1, wherein the layered silicates are anion-exchange clay.

7. The carbon nanocapsule-layered silicate hybrid as claimed in claim 1, wherein the layered silicates have an aspect ratio of at least 30.

8. The carbon nanocapsule-layered silicate hybrid as claimed in claim 1, wherein the layered silicates have an aspect ratio of about 50-5000.

9. The carbon nanocapsule-layered silicate hybrid as claimed in claim 1, wherein the hybrid is dispersed in a polar solvent or a non-polar solvent.

10. The carbon nanocapsule-layered silicate hybrid as claimed in claim 9, wherein the polar solvent comprises water, alcohols, ketones, ethers, esters, alkanoic acids, chloro-containing solvents, nitrogen-containing solvents, or combinations thereof.

11. The carbon nanocapsule-layered silicate hybrid as claimed in claim 9, wherein the non-polar solvent comprises aliphatic hydrocarbon solvents, aromatic hydrocarbon solvents, cycloaliphatic hydrocarbon solvents, or combinations thereof.

12. The carbon nanocapsule-layered silicate hybrid as claimed in claim 9, wherein the hybrid is dispersed in the polar or non-polar solvent with a solid content of about 0.01-30 wt %.

13. A method for preparing a carbon nanocapsule-layered silicate hybrid, comprising:
    providing a plurality of carbon nanocapsules having a polyhedral shape;
    providing a plurality of layered silicates having a platelet-shape; and
    mixing the carbon nanocapsules and the layered silicates by a physical process for exerting a shear force such that the carbon nanocapsules and the layered silicates are mutually dispersed into a homogeneous dispersion due to geometric shape difference, thus forming the hybrid, wherein a weight ratio of the carbon nano capsules to the layered silicates is about 1:10 to 10:1.

14. The method as claimed in claim 13, wherein the physical process further exerts an impact force.

15. The method as claimed in claim 13, wherein the physical process comprises grinding.

16. The method as claimed in claim 15, wherein the grinding is carried out by a grinding mill or by pestle and mortar.

17. The method as claimed in claim 13, wherein the carbon nanocapsules are hollow carbon nanocapsules or heteroatom-containing carbon nanocapsules.

18. The method as claimed in claim 13, wherein the carbon nanocapsules are filled with elementary metals, metal compounds, or metal alloys.

19. The method as claimed in claim 13, wherein the layered silicates comprise smectite clay, vermiculite, halloysite, sericite, mica, synthetic mica, layered double hydroxide (LDH), synthetic smectite clay, or combinations thereof.

20. The method as claimed in claim 13, wherein the layered silicates are cation-exchange clay.

21. The method as claimed in claim 13, wherein the layered silicates are anion-exchange clay.

22. The method as claimed in claim 13, wherein the layered silicates have an aspect ratio of at least 30.

23. The method as claimed in claim 13, wherein the layered silicates have an aspect ratio of about 50-5000.

24. The method as claimed in claim 13, further comprising dispersing the hybrid in a polar solvent or a non-polar solvent.

25. The method as claimed in claim 24, further comprising dispersing the hybrid in the polar or non-polar solvent by magnetic stirring, ultrasonication, or mechanical stirring.

26. The method as claimed in claim 24, wherein the polar solvent comprises water, alcohols, ketones, ethers, esters, alkanoic acids, chloro-containing solvents, nitrogen-containing solvents, or combinations thereof.

27. The method as claimed in claim 24, wherein the non-polar solvent comprises aliphatic hydrocarbon solvents, aromatic hydrocarbon solvents, cycloaliphatic hydrocarbon solvents, or combinations thereof.

28. The method as claimed in claim 24, wherein the hybrid is dispersed in the polar or non-polar solvent with a solid content of about 0.01-30 wt %.

* * * * *